Figure 1:
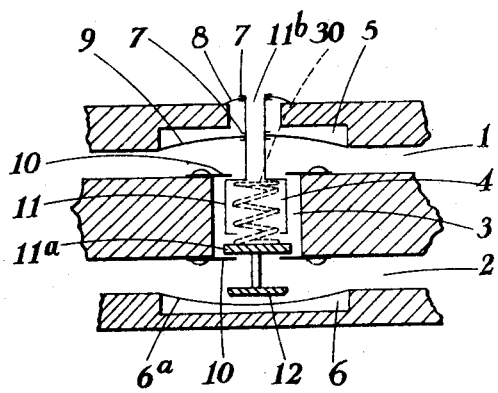

Sept. 20, 1932.  G. B. ILES  1,878,706
VALVE
Filed Sept. 3, 1931

INVENTOR.
G. B. ILES.
BY
ATTORNEYS.

Patented Sept. 20, 1932

1,878,706

UNITED STATES PATENT OFFICE

GORDON BUTLER ILES, OF BROADSTAIRS, ENGLAND

VALVE

Application filed September 3, 1931, Serial No. 561,052, and in Great Britain September 27, 1930.

This invention relates to improvements in valves, and is particularly suitable for fluid actuated valves, though its use is not confined thereto.

The main feature of the present invention is a new or improved type of valve which I term an expanding valve. Such valve is placed in a chamber provided with seatings at either end, and may be moved as a whole in the ordinary way so as to make contact with the seating at either end and put the valve chamber into communication with the exterior chamber or the like at the other end. But according to the present invention the valve is made in two parts which can be separated, so as to put the valve chamber into communication with a third exterior chamber or the like through a passage in the interior of the valve itself, while at the same time the two ends of the valve may be in contact with their seatings so as to cut off the communications at the two ends of the valve chamber. One portion of such valve is preferably made with a seating against which the other part may fit.

This expanding valve can therefore put the valve chamber into communication with any one of three chambers or the like, and so admit into such valve chamber fluid at three different pressures, or it may be of three different kinds. It might equally be used to provide three different ways of exit from such valve chambers. It will be seen that this valve has three different positions of rest.

The valve as a whole and its component parts may be actuated in any desired manner, but this type of valve is particularly suitable for fluid actuation.

One application of such expanding valves is for use with apparatus in whose operation three working pressures are employed e. g. piano players or the like where it is desired to strike notes with different force by subjecting the pneumatics to different degrees of vacuum, whilst such pneumatics must be put into communication with the atmosphere after the notes have been sounded, and as an illustration of the use of the expanding valve, I will describe its application to such a player by reference to the drawing, which are in diagrammatic form.

Figure 2:
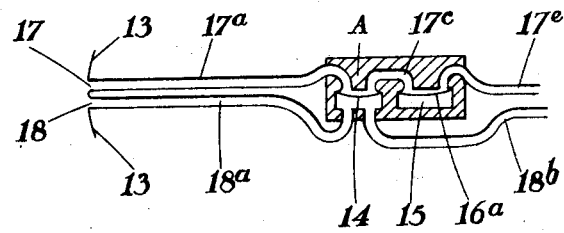

The accompanying drawing shows in Fig. 1, a sectional view of the valve device, and Fig. 2 means for actuating the valve controlled from the tracker board of a piano player.

1 and 2 are the ducts which are charged with two different degrees of vacuum. 3 is the valve chamber which is connected to the mechanism which it is desired the valve shall actuate. 4 is the inner chamber of the valve that may supply yet a third degree of vacuum or outer air as desired. 5 is a purse chamber, the purse 9 of which moves the upper component 11 of the valve. 6 is a purse chamber, the purse 6a of which affects the pallet 11a forming the lower component of the valve. 7 are locknuts, or collars or some suitable means for holding the purse 9 and a secondary purse 8. 10 are valve seatings. 11b is a chimney or funnel leading to the inner chamber 4 of the valve. 12 is a lifting disc connected to 11a.

Fig. 2 shows a simple form of membrane box or device used for controlling the valve device according to Figure 1.

13 is the tracker bar. 17 and 18 holes therein. 17a a tube leading from the hole 17 and extending into the box A. A passage 17c forms a bridge between 17a and a tube 17e leading to the purse chamber 6. A vent rail may be interposed in this communication path. A tube 18a leads from the hole 18 and extends into the box A. A tube 18b leads from the box to the purse chamber 5. Here again a vent rail may be used. 15 is a separate chamber. 14 and 16a are membrane valves for opening and closing the path 17a, 17c and 17e.

The following is a description of the working of the apparatus.

It is to be understood that the ducts 1 and 2 are charged with two different degrees of vacuum continuously applied. The chamber 3 is connected with the pneumatic motor or bellows which strikes the note.

Now dealing with an accompanimental note. First of all the perforation or hole in the music sheet exposes 17 and as the chamber 15 is not charged, through communication between 17a and 17e is blocked by the membrane 16a and the purse 6a of the chamber 6 remains uninflated.

The perforation or hole now opens 18. Firstly, the vacuum at 14 is broken down, and communication between 17a and 17e becomes doubly blocked as the membrane 14 is forced upon its seating. But through 18a, 18b, purse 9 of chamber 5 is inflated and the valve component 11 moves downwards. Chambers 3 and 4 are consequently no longer in communication, so that normal air is cut off, but 3 now comes into communication with 1 and the note strikes at the pressure of 1.

Now consider an accenting note.

It first opens 17, at the same time the chamber 15 is exhausted by the operation of an accenting perforation in alignment with the accenting note e. g. such perforation may admit air to actuate a slide which will connect 15 with a source of vacuum. The passage 17a, 17c, 17e is then clear right the way through to the purse chamber 6, and the purse 6a is inflated. As a result the component 11a rises. The chambers 3 and 4 are consequently no longer in communication, but 3 is now in communication with 2 and the note strikes at the pressure in 2 which is in this case used for the melody or accenting note. The perforation in the music roll now reaches 18 which it opens, the vacuum at 14 is broken down and through communication between 17a and 17e is closed by membrane 14. The result is that the component 11a falls as also does the component 11 as purse 6a of chamber 6 returns to its position of rest at the same time as purse 9 of chamber 5 is inflated. These combined movements prevent communication between 3 and 4 taking place, but 3 is now connected to 1 instead of 2 and the note is sustained throughout the duration of the perforation.

A comparison between the two kinds of notes as above explained acting together will show how simultaneous theme is obtained. The accenting notes reach 17 when accompanimental notes reach 18 and the accenting notes are accompanied by an accenting perforation in alignment with them which accenting perforation affects the vacuum in the chamber 15.

30 indicates the light spring which may be used to keep the components of the valve expanded.

When a note hole or perforation has passsed the tracker bar hole 18 all parts return to their normal positions with the chamber 3 in communication with the chamber 4 which is open to atmosphere, or normal air pressure.

It is clear that the apparatus may be varied by making the control opening function to play an unacccented instead of an acented note the soft and heavy wind connections being interchanged or the control device may be put into operation by covering such opening instead of uncovering it, the apparatus can also be used with players of the organ type employing the double touch system.

Although I have described in detail this one application of the valve I would have it understood that the invention in its broad form covers the use of this expanding valve for any purpose for which it may be applicable. I would further have it understood that when I speak of opening communication with a chamber or the like I include communication with a passage or with any body of fluid such, for example, as the atmosphere.

Although I have shown and described a valve in which the chamber 4 has a vertical communication 11b it is equally practicable to lead communications through the sides of the expanding valve 11 in a horizontal position.

These communications may take the form of slide valves or else the hollow valve 11 may be supported on flexible tubes which serve the purpose of 11b; in which case the top of 11 is closed and may be fitted with a pusher disc.

What I claim is:—

1. A construction of an expanding valve, comprising a hollow component adapted to fit against an external seating, and itself having a seating against which a second component in one position fits, said second component when moved away from this seating, fitting against a further seating.

2. An expanding valve member made in two parts and capable of movement as a whole to open either of two communications from the chamber in which it moves, and also capable by the movement apart of its component parts, of closing both such communications and opening a third communication through its own interior.

3. A four way valve device comprising a four-way casing one way being always open, a valve member made up of two components one component controlling communication between the open way and two of the remaining ways and the second component communicating with the other remaining way.

4. A four way valve device according to claim 3, having two seatings for the valve member, the normal position of the valve member being that in which ingress of the fluid at both the said seatings is shut off.

5. An expanding valve according to claim 2 in which the component parts are normally held apart by means of a spring.

6. The combination with a fluid actuated expanding valve employed to actuate the striking pneumatic of a piano player or the like, of control apparatus in the form of a membrane box, which when an accented note is to be sounded moves a selected purse controlling the expanding valve so that this is moved to cut off the pneumatic from atmosphere and open it to the heavy wind and when an unaccented note is to be sounded moves another selected purse controlling the expanding valve, so that said valve cuts off the pneumatic from atmosphere and opens it to the soft wind.

In testimony whereof, I affix my signature.

GORDON BUTLER ILES.